United States Patent [19]

Pruckmayr

[11] 4,153,786

[45] May 8, 1979

[54] METHOD FOR PREPARING ESTER END-CAPPED COPOLYETHER GLYCOLS

[75] Inventor: Gerfried Pruckmayr, Media, Pa.

[73] Assignee: E. I. Du Pont de Nemours and Company, Wilmington, Del.

[21] Appl. No.: 910,128

[22] Filed: May 26, 1978

Related U.S. Application Data

[63] Continuation-in-part of Ser. No. 782,736, Mar. 30, 1977, abandoned.

[51] Int. Cl.² .............................................. C08G 65/20
[52] U.S. Cl. ................................... 528/408; 260/900; 528/242; 560/263
[58] Field of Search ........................... 260/615 B, 900; 528/242, 408; 560/263

[56] References Cited

U.S. PATENT DOCUMENTS

| | | | |
|---|---|---|---|
| 3,282,875 | 11/1966 | Connally et al. | 260/29.6 |
| 3,405,105 | 10/1968 | Blackwell | 260/79.3 |
| 3,624,053 | 11/1971 | Gibbs et al. | 260/79.3 R |
| 3,644,567 | 2/1972 | Smith et al. | 260/829 |
| 3,652,465 | 3/1972 | Takakura et al. | 260/2 BP |
| 3,824,219 | 7/1974 | Smith et al. | 260/79.3 R |
| 3,864,287 | 2/1975 | Matsuda et al. | 260/2 XA |

FOREIGN PATENT DOCUMENTS

854958  11/1960  United Kingdom.

*Primary Examiner*—Earl A. Nielsen

[57] ABSTRACT

Ester end-capped copolyether glycol is prepared by copolymerizing tetrahydrofuran and an alkylene oxide or cyclic acetal in a reaction mixture which contains, in addition to the tetrahydrofuran and alkylene oxide or cyclic acetal, (1) a polymeric catalyst which contains α-fluoro sulfonic acid groups, and (2) an acylium ion precursor such as acetic anhydride.

8 Claims, No Drawings

METHOD FOR PREPARING ESTER END-CAPPED COPOLYETHER GLYCOLS

CROSS REFERENCE TO RELATED APPLICATION

This application is a continuation-in-part of application Ser. No. 782,736, filed Mar. 30, 1977, now abandoned.

BACKGROUND OF THE INVENTION

This invention relates to an improved method for copolymerizing THF and an alkylene oxide or cyclic acetal. It is more particularly directed to such a method carried out in a reaction medium which contains an acylium ion precursor and a polymeric catalyst which contains α-fluoro sulfonic acid groups.

Copolyether glycols, i.e., polyethers made by copolymerizing alkylene oxides or cyclic acetals with tetrahydrofuran (THF), and having terminal hydroxyl groups, are known and are useful in the manufacture of polyurethanes. These glycols can be prepared by copolymerizing THF and alkylene oxides, using as a catalyst a polymer of ethylenically unsaturated monomers containing α-fluoro sulfonic acid groups, as shown in copending application Ser. No. 868,112, filed Jan. 9, 1978.

While that process is satisfactory, it tends to proceed rather more slowly than is usually desired. It has now been found that the rate of such a copolymerization can be significantly increased if the polymerization reaction mass contains an acylium ion precursor. This improved process yields ester end-capped copolyether glycol, which can be converted to copolyether glycol by alcoholysis.

SUMMARY OF THE INVENTION

The process of the invention comprises bringing the THF, the alkylene oxide or cyclic acetal, the catalyst and the acylium ion precursor together under conditions suitable for copolymerization.

The reactions involved are shown in the following illustrative equations.

Initiation

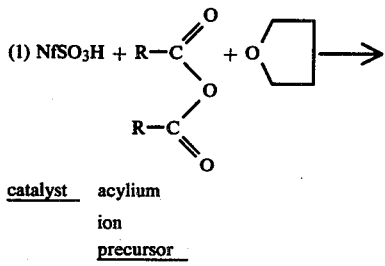

catalyst    acylium
            ion
            precursor

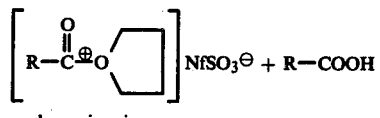

acyl oxonium ion

Propagation

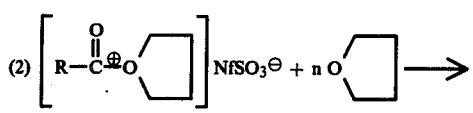

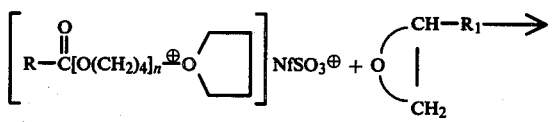

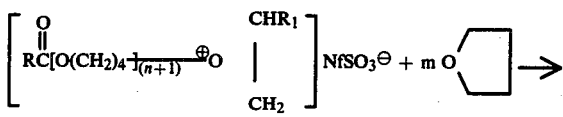

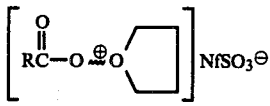

Chain Transfer

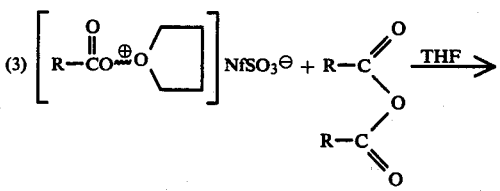

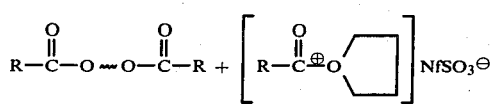

Termination (4) 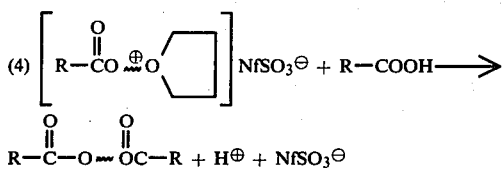

Catalyst Regeneration (5) $NfSO_3^{\ominus} + H^{\oplus} \longrightarrow NfSO_3H$ In the foregoing equations, R is hydrogen or a hydrocarbon radical, preferably an alkyl radical of 1–36 carbon atoms, $R_1$ is hydrogen, a hydrocarbon radical or a halocarbon radical of 1–4 carbon atoms, $NfSO_3H$ represents the catalyst, 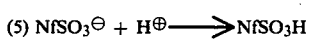 represents the copolymer chain, and m and n are 1–40.

DETAILED DESCRIPTION OF THE INVENTION

The alkylene oxides which can be used as comonomers in the process of the invention are those containing 2 or 3 carbon atoms in the alkylene oxide ring. The alkylene oxide can be unsubstituted or substituted with, for example, alkyl groups, aryl groups or halogen atoms. Illustrative of such alkylene oxides are ethylene oxide, 1,2-propylene oxide, 1,3-propylene oxide, 1,2-butylene oxide, 1,3-butylene oxide, 2,2-bis-chloromethyl oxetane and epichlorohydrin.

The cyclic acetals which can be used as comonomers are those represented by the structure

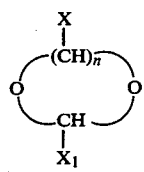

where
n is 2–4
and
X and $X_1$ are hydrogen or an alkyl radical of 1–4 carbon atoms.

Mixtures of alkylene oxides and mixtures of alkylene oxides and cyclic acetals can also be used. The oxides and acetals can be any of those commercially available and are preferably dry (i.e., have a water content of less than 0.002%, by weight).

The THF can likewise be any of those commercially available but preferably is dry, has a peroxide content of less than 0.002%, by weight, and contains an oxidation inhibitor such as butylated hydroxytoluene to prevent formation of undesirable byproducts and color.

If desired, 0.1–50% of the weight of the THF, can be replaced by an alkyl tetrahydrofuran represented by the structure

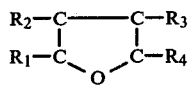

where any one of $R_1$, $R_2$, $R_3$ or $R_4$ is an alkyl radical of 1–4 carbon atoms, the remaining R's being hydrogen.

The catalyst used in the process of the invention is a homopolymer of an ethylenically unsaturated monomer (a) containing groups such that the final polymer will contain groups of the formula

or

where
∾ represents the catalyst polymer chain or a segment thereof;
D is hydrogen, an aliphatic or aromatic hydrocarbon radical of 1–10 carbon atoms, a halogen atom or a segment of the polymer chain;
X and Y are hydrogen, halogen or an aliphatic or aromatic hydrocarbon radical of 1–10 carbon atoms, but at least one is fluorine;
R is a linear or branched linking group having up to 40 carbon atoms in the principal chain;
and
Z is hydrogen, halogen or an aliphatic or aromatic hydrocarbon radical of 1–10 carbon atoms;
or a copolymer of monomer (a) with at least one other copolymerizable ethylenically unsaturated monomer (b).

The linking group defined by R in formula (7) can be a homogeneous one such as an alkylene radical, or it can be a heterogeneous one such as an alkylene ether radical. In the preferred catalysts, this linking radical contains 1–20 carbon atoms in the principal chain. In the especially preferred catalyst, R is a radical of the structure

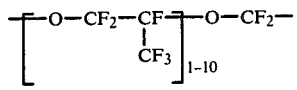

Illustrative of monomer (a) are such monomers as trifluorovinyl sulfonic acid, linear or branched chain vinyl monomers containing α-fluoro sulfonic acid group precursors and perfluoroalkylvinyl ethers containing α-fluoro sulfonic acid group precursors.

Illustrative of monomer (b) are such monomers as ethylene, styrene, vinyl chloride, vinyl fluoride, vinylidene fluoride, chlorotrifluoroethylene (CTFE), bromotrifluoroethylene (BTFE), vinyl ethers, perfluoroalkyl vinyl ethers, butadiene, tetrafluoroethylene (TFE) and hexafluoropropylene (HFP).

The homopolymerization and copolymerization can be done according to the procedures described in U.S. Pat. No. 3,784,399 to Grot, and the patents cited therein. Monomer ratios are selected to give the resulting polymer the proper equivalent weight.

The catalysts have equivalent weights of 950–1,500, preferably 1,000–1,300. Equivalent weight of a catalyst is that weight in grams which contains one gram equivalent weight of sulfonic acid groups, and can be determined by titration.

The catalysts preferably have solubilities such that no more than about 5%, by weight, dissolves in the reaction mass at the reaction temperature when the reaction is run in a batch mode for a time to be specified hereinafter. This solubility is determined gravimetrically.

It is desirable that the solubility of the catalyst be as low as possible because this minimizes catalyst loss and permits the process to be continuously run for longer periods without catalyst replenishment. Preferably, the solubility is no more than about 1%, by weight, and even more preferably is below the threshold of detection with present analytical techniques.

The catalyst should be effectively free of functional groups, other than $-SO_3H$ groups, which might interfere with the polymerization reaction. "Effectively free" means the catalyst may contain a small number of such groups, but not so many that the reaction is affected adversely or the product contaminated. Illustrative of such groups are carboxyl groups, hydroxyl groups and amino groups.

Catalysts whose polymer chains are of perfluorocarbon monomers are preferred for use in the process of the invention. Illustrative of such monomers are TFE, HFP, CTFE, BTFE and perfluoroalkyl vinyl ethers. Mixtures of monomers can also be used.

Even more preferred as catalysts are copolymers of TFE or CTFE and a perfluoroalkyl vinyl ether containing sulfonic acid group precursors. Most preferred in this class are copolymers of TFE or CTFE and a monomer represented by the structure

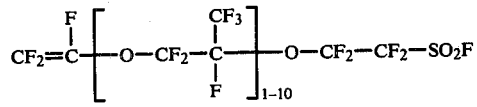

(8)

These copolymers are prepared in the sulfonyl fluoride form and are then hydrolyzed to the acid form as described in U.S. Pat. No. 3,692,569.

Most preferred as catalysts are copolymers of TFE and monomers of formula (8) in which the respective monomer unit weight ratios are 50–75/25–50. Such copolymers, having equivalent weights of 1100, 1150 and 1500, are sold by E. I. du Pont de Nemours and Company as Nafion ® perfluorosulfonic acid resin.

The acylium ion precursor used in the process of the invention can be any compound capable of generating an acyl oxonium ion, as shown in equation (1), under reaction conditions.

"Acylium ion", as used herein, means an ion represented by the structure $R-C^{\oplus}=O$, where R is hydrogen or a hydrocarbon radical, preferably an alkyl radical of 1–36 carbon atoms.

Representative of acylium ion precursors are acyl halides and carboxylic acid anhydrides. Anhydrides of carboxylic acids whose carboxylic acid moieties contain 1–36 carbon atoms are preferred, especially those of 1–4 carbon atoms.

Illustrative of such anhydrides are acetic anhydride, propionic anhydride and formic-acetic anhydride. The anhydride preferred for use because of its efficiency is acetic anhydride.

The copolymerization reaction is carried out by first charging a reactor with THF, an alkylene oxide or cyclic acetal, an acylium ion precursor and catalyst.

It has been found that use of a dry catalyst significantly increases reaction speed. It is best that the catalyst be as dry as possible, but removing all the water is difficult, so in the usual case the catalyst is dried before use by holding it at about 110° C. and a pressure of about 0.1 mm of mercury until it reaches constant weight.

The amounts of alkylene oxide or cyclic acetal and THF in the reaction mass can be varied to provide copolymers having alkylene oxide or acetal/THF weight ratios of 1–90/10–99, as is well known in the art. The ratio for any given copolymer is dictated by its use.

The catalyst concentration in the reaction mass can range from about 0.1% to about 10%, by the total weight of the monomers present, preferably about 2–10%, and the acylium ion precursor is present at a concentration of 0.1–10 mol percent, preferably 0.7–10 mol percent.

When the charge is complete, the reaction mass is brought to and held at a temperature ranging from ambient temperature to 80° C., preferably 20°–60° C., with stirring or agitation. If higher reaction temperatures are desired, the reaction can be run at pressures of up to about 5,000 atmospheres. The reaction is preferably run in an inert atmosphere such as nitrogen.

Polymerization is allowed to continue until a copolymer with the desired molecular weight has been obtained, as determined by periodic sampling and analysis for end groups by infrared or nuclear magnetic resonance spectroscopy. This point is ordinarily reached in 10 minutes to 20 hours, the time depending on the reaction temperature and the concentrations of acylium ion precursor and catalyst. Further polymerization is then prevented by separating the catalyst from the reaction mass by filtration, centrifugation or decantation. The catalyst can then be reused.

The process of the invention can be run batchwise or continuously. When run continuously, the THF, alkylene oxide or cyclic acetal, acylium ion precursor and catalyst are continuously fed into a reactor at rates which provide the requisite concentrations and which provide a suitable residence time, and copolymer product and excess reactants are continuously removed. Preferably, the catalyst is charged initially and is held in the reaction zone by suitable screens or filters, and can remain in continuous use.

After the reaction mass is withdrawn from the reactor, whether it be a batch reactor or a continuous reactor, it is separated from unreacted THF, unreacted alkylene oxide or cyclic acetal and unreacted acylium ion precursor by conventional techniques such as extraction, precipitation or volatilization, to give the ester end-capped copolyether glycol product. This product can be converted to copolyether glycol by the method shown in Belgian Pat. No. 853,028, granted Sept. 30, 1977.

EXAMPLE 1

Nafion ® resin, equivalent weight 1200, was dried to constant weight of 110° C. under a vacuum of 0.1 mm of mercury, and 1 g of this catalyst was then mixed with 40 g of THF (dried over sodium), 10 g of dioxolane and 5 g of acetic anhydride. This mixture was held, with stirring, at 25° C., in a nitrogen atmosphere, in a polymerization kettle equipped with drying tubes to exclude moisture.

After 7 hours, the catalyst was removed from the mixture by filtration, the pH of the filtrate was brought to above 7 by the addition of calcium hydroxide, and the calcium salts which precipitated were removed by filtration.

Unreacted monomers were then removed from the filtrate by heating it on a steam bath under a pressure of 10 mm of mercury, to give 20 g of acetate end-capped copolyether glycol containing 14.5 mol percent of dioxolane units, as determined by nuclear magnetic resonance spectroscopy.

EXAMPLE 2

Nafion ® resin, equivalent weight 1100, was dried to constant weight at 110° C. under a vauum of 0.1 mm of mercury, and 2.5 g of this catalyst was then mixed with 25 g of THF (dried over sodium), and 2.5 g of acetic anhydride. This mixture was held at 25° C., with stirring, for 20 minutes and to it was then added a mixture of 10 g of propylene oxide and 35 g of THF. The resulting mixture was held, with stirring, at 25° C., in a polymerization kettle equipped with drying tubes to exclude moisture. After 16 hours, 25 ml of methanol were added and the catalyst was removed from the mixture by filtration. Volatiles were then stripped from the filtrate by heating it at 80° C. under a pressure of 10 mm of mercury, to give 14 g of copolymer.

For further purification this copolymer was then dissolved in about 100 ml of toluene and the resulting solution washed five times with 20 ml portions of water. Toluene was then removed from the solution by heating it at 80° C. under a pressure of 0.5 mm of mercury, to give acetate end-capped copolyether glycol containing 8 mol percent of propylene oxide units, as determined by nuclear magnetic resonance spectroscopy.

I claim:

1. A process for preparing ester end-capped copolyether glycol, the process comprising
   (A) bringing together, under conditions suitable for reaction,
      (1) tetrahydrofuran;
      (2) an alkylene oxide containing 2 or 3 carbon atoms in its ring, or a cyclic acetal represented by the structure

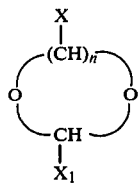

where
   n is 2-4 and
   X and $X_1$ are hydrogen or an alkyl radical of 1-4 carbon atoms;
      (3) an acylium ion precursor; and
      (4) as a catalyst, a homopolymer of an ethylenically unsaturated monomer (a) containing groups such that the final polymer will contain groups of the formula

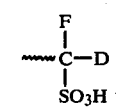

or

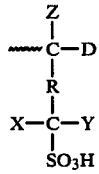

where ⌇ represents the polymer chain or a segment thereof;
   D is hydrogen, an aliphatic or aromatic hydrocarbon radical of 1-10 carbon atoms, halogen or a segment of the polymer chain;
   X and Y are hydrogen, halogen or an aliphatic or aromatic hydrocarbon radical of 1-10 carbon atoms, but at least one of X or Y must be fluorine;
   R is a linear or branched linking group having up to 40 carbon atoms in the principal chain; and
   Z is hydrogen, halogen or an aliphatic or aromatic hydrocarbon radical of 1-10 carbon atoms;
   or a copolymer of monomer (a) with at least one other copolymerizable ethylenically unsaturated monomer (b), the homopolymer or copolymer having an equivalent weight of 950-1500 and a solubility such that no more than about 5%, by weight, dissolves in the reaction medium at the reaction temperature, and then
   (B) separating the resulting ester end-capped copolyether glycol from the reaction mass.

2. The process of claim 1 in which the acylium ion precursor in (A) (3) is an anhydride of an aliphatic carboxylic acid whose carboxylic acid moiety contains 1-36 carbon atoms.

3. The process of claim 2 in which the acylium ion precursor is acetic anhydride.

4. The process of claim 1 in which the alkylene oxide is ethylene oxide or propylene oxide.

5. The process of claim 4 in which the catalyst is a polymer of TFE or CTFE and R is

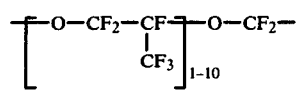
6. The process of claim 5 in which the catalyst is a hydrolyzed copolymer of TFE or CTFE and a monomer represented by the structure
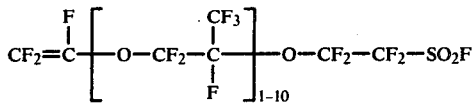
7. The process of claim 1 in which the catalyst has a solubility in the reaction mass at the reaction temperature of no more than about 1%, by weight.
8. The process of claim 1 in which the catalyst has an equivalent weight of 1,000–1,300.
* * * * *